(12) United States Patent
Kanno et al.

(10) Patent No.: US 9,785,552 B2
(45) Date of Patent: Oct. 10, 2017

(54) COMPUTER SYSTEM INCLUDING VIRTUAL MEMORY OR CACHE

(71) Applicant: Kabushiki Kaisha Toshiba, Minato-ku, Tokyo (JP)

(72) Inventors: Shinichi Kanno, Tokyo (JP); Hideki Yoshida, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 77 days.

(21) Appl. No.: 14/722,606

(22) Filed: May 27, 2015

(65) Prior Publication Data

US 2016/0202907 A1    Jul. 14, 2016

Related U.S. Application Data

(60) Provisional application No. 62/103,139, filed on Jan. 14, 2015.

(51) Int. Cl.
| | | |
|---|---|---|
| *G06F 12/00* | (2006.01) | |
| *G06F 12/08* | (2016.01) | |
| G06F 12/0804 | (2016.01) | |
| G06F 12/0888 | (2016.01) | |
| G06F 12/1009 | (2016.01) | |
| G06F 12/109 | (2016.01) | |

(52) U.S. Cl.
CPC .......... *G06F 12/08* (2013.01); *G06F 12/0804* (2013.01); *G06F 12/0888* (2013.01); *G06F 12/1009* (2013.01); *G06F 12/109* (2013.01); *G06F 2212/1032* (2013.01); *G06F 2212/657* (2013.01)

(58) Field of Classification Search
None
See application file for complete search history.

(56) References Cited

U.S. PATENT DOCUMENTS

| | | |
|---|---|---|
| 8,560,761 B2 | 10/2013 | Tzeng |
| 8,661,183 B2 | 2/2014 | Takeuchi |
| 8,775,752 B2 | 7/2014 | Yoshida et al. |
| 2003/0046493 A1* | 3/2003 | Coulson ................ G06F 12/124 711/118 |

(Continued)

FOREIGN PATENT DOCUMENTS

| | | |
|---|---|---|
| WO | 2010/055937 A1 | 5/2010 |
| WO | 2011/033600 A1 | 3/2011 |

*Primary Examiner* — David X Yi
*Assistant Examiner* — Craig Goldschmidt
(74) *Attorney, Agent, or Firm* — David M. Tennant

(57) ABSTRACT

According to one embodiment, a computer system includes a first memory unit, a second memory unit having a data transfer rate lower than that of the first memory unit and a controller. The controller controls transfer of unit data. The unit data includes an indicating portion indicating whether the unit data is to be retained in the second memory unit. When the unit data is transferred from the second memory unit to the first memory unit and the unit data is to be retained in the second memory unit, the controller sets a first state to the indicating portion of the respective unit data. When the unit data is transferred from the first memory unit to the second memory unit, the controller writes the respective unit data in which the indicating portion is set to the first state, to the second memory unit.

17 Claims, 7 Drawing Sheets

(56) References Cited

U.S. PATENT DOCUMENTS

| | | | |
|---|---|---|---|
| 2007/0174554 A1* | 7/2007 | Hutton | G06F 12/0811 |
| | | | 711/133 |
| 2011/0145534 A1* | 6/2011 | Factor | G06F 8/60 |
| | | | 711/170 |
| 2014/0310464 A1* | 10/2014 | Chambliss | G06F 12/0804 |
| | | | 711/119 |

* cited by examiner

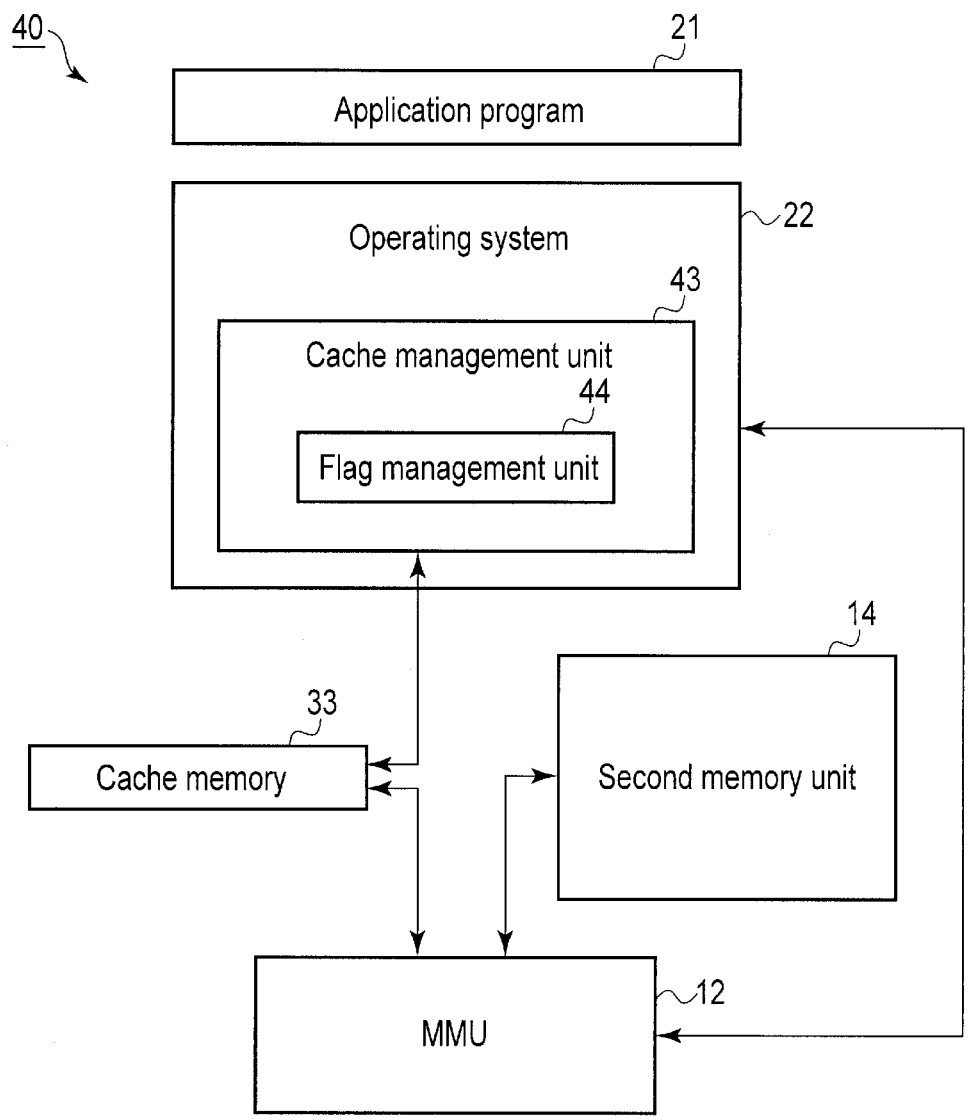
F I G. 6

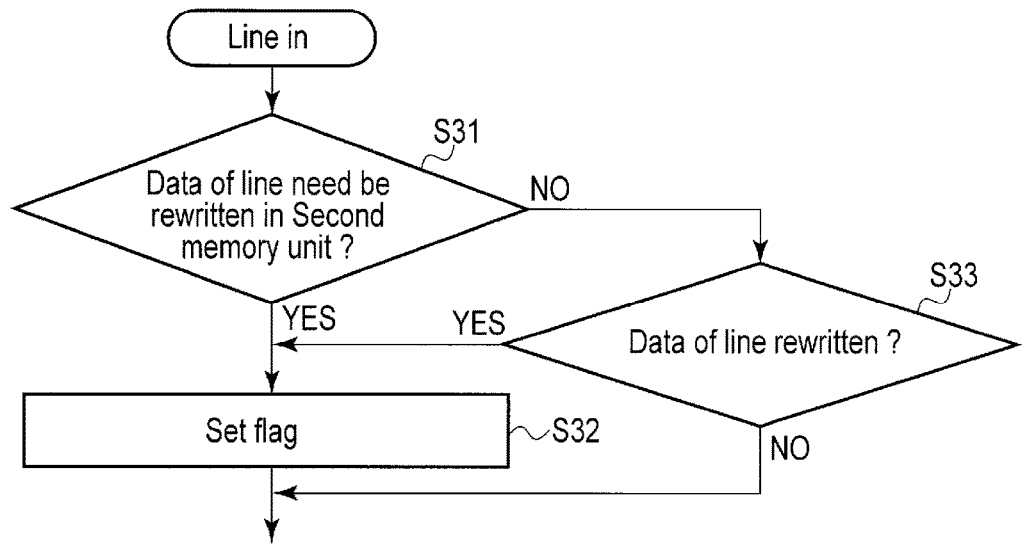
F I G. 8A
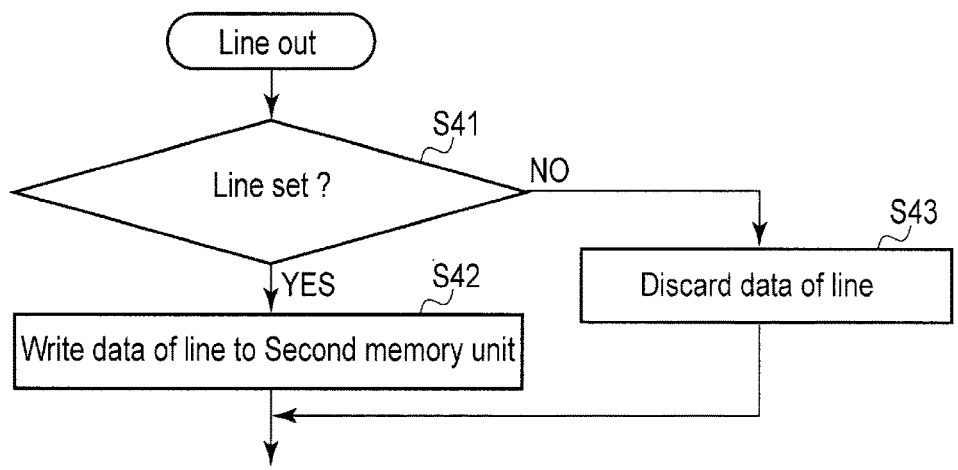
F I G. 8B

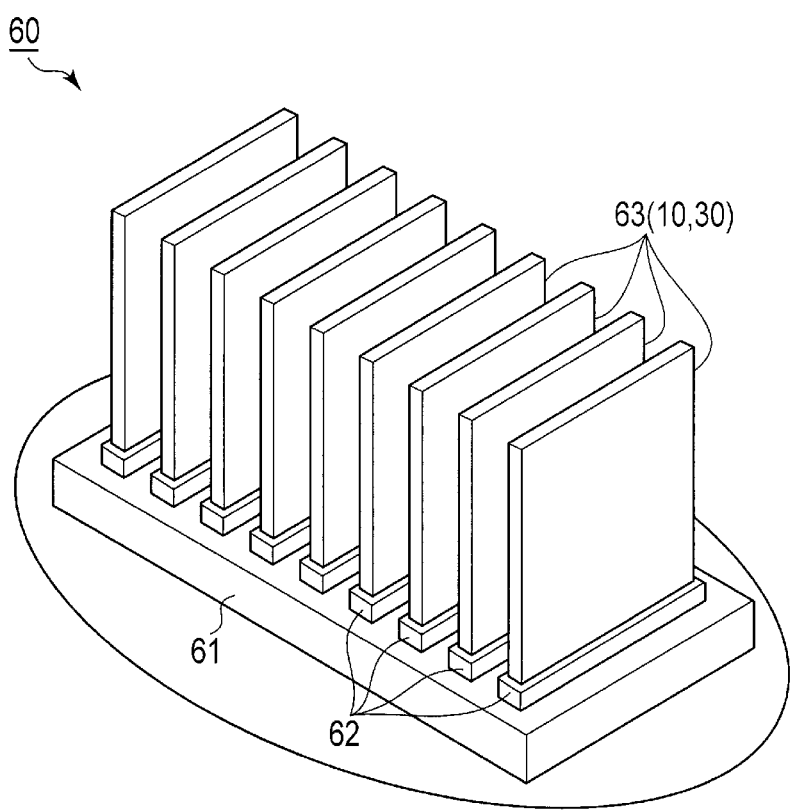
F I G. 9

COMPUTER SYSTEM INCLUDING VIRTUAL MEMORY OR CACHE

CROSS-REFERENCE TO RELATED APPLICATIONS

This application claims the benefit of U.S. Provisional Application No. 62/103,139, filed Jan. 14, 2015, the entire contents of which are incorporated herein by reference.

FIELD

Embodiments described herein relate generally to a computer system comprising a virtual memory or cache.

BACKGROUND

There is a destructive readout memory in which the recorded data is destroyed when the data is read. When data needs to be retained continuously in a destructive readout memory even after read therefrom, the data is written back to the destructive readout memory. For a destructive readout memory having a limited number of writes, each time data read from the destructive readout memory is written back thereto, the number of writes increases to shorten the life of the destructive readout memory.

BRIEF DESCRIPTION OF THE DRAWINGS

FIG. 6 is a schematic diagram schematically showing a configuration of firmware of the computer system according to the second embodiment.

FIGS. 8A and 8B show a flowchart to illustrate the operation of the second embodiment.

FIG. 9 is a perspective view showing an example of a server to which the first or second embodiment is applied.

DETAILED DESCRIPTION

In general, according to one embodiment, a computer system comprises a first memory unit, a second memory unit and a controller. The second memory unit has a data transfer rate lower than that of the first memory unit. The controller is configured to control transfer of unit data between the first memory unit and the second memory unit. The unit data includes an indicating portion indicating whether the unit data is to be retained in the second memory unit. When the unit data is transferred from the second memory unit to the first memory unit and the unit data is to be retained in the second memory unit, the controller sets a first state to the indicating portion of the respective unit data. When the unit data is transferred from the first memory unit to the second memory unit, the controller writes the respective unit data in which the indicating portion is set to the first state, to the second memory unit.

Embodiments will now be described with reference to drawings.

First Embodiment

Figure 1:
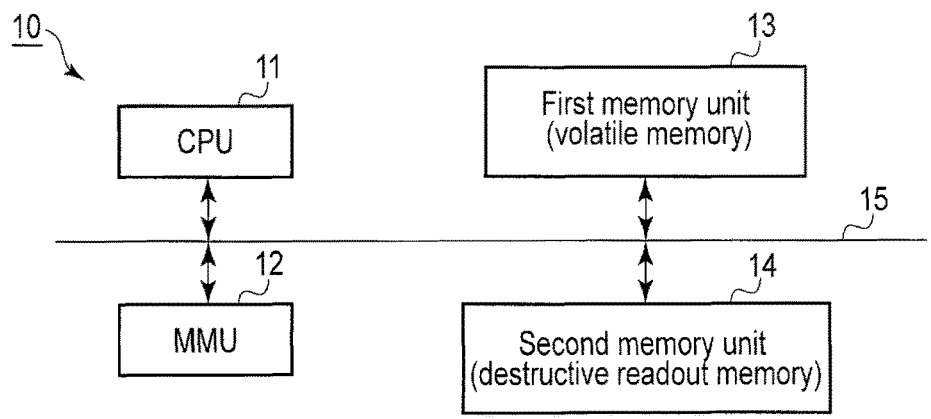
FIG. 1 schematically shows an example of a computer system according to the first embodiment.

FIG. 1 is a schematic diagram showing an example of a computer system comprising, for example, a virtual memory, according to the first embodiment.

A computer system 10 comprises a processor (central processing unit [CPU] in this embodiment) 11, a memory management unit (MMU) 12, a first memory unit 13 (main memory) and a second memory unit 14 (for example, large-capacity disk storage), etc. The CPU 11, MMU 12, first memory unit 13 and second memory unit 14 are connected to each other by a bus 15.

Here, the virtual memory is a technique of feigning to an application program that there is a memory having a large storage capacity by transferring data between the second memory unit 14 and the first memory unit 13 as required. The first memory unit 13 is constituted by at least one of a volatile memory and a non-volatile memory, having a high data transfer rate or a high accessing speed and relatively a small storage capacity. The second memory unit 14 is constituted by a non-volatile memory having a data transfer rate lower than that of the first memory unit 13 and a large storage capacity.

As one of the techniques of controlling replacement between a virtual memory space and a real memory space, and of translating from a virtual address to a real address, a paging technique is known, in which a page is set as a unit. By address translation by paging, a virtual page on the virtual memory is associated with a physical page on a physical memory.

The computer system 10 is a computer which operates an operating system compatible with virtual memory by paging. Paging is executed by the operating system and the MMU 12. A page represents a single region, and using one page as a unit, data is transferred between a virtual memory space and a real memory space. Each page comprises code and data, and there are virtual pages and physical pages. The computer system 10 is a computer, for example, used by an end user to execute processes of office work. The embodiment is not limited to this, but the computer system 10 may be a server configured to process requests of clients received via networks or a built-in computer configured to execute control of a device.

The CPU 11 is configured to control the entire operation of the computer system 10. The CPU 11, for example, reads the operating system from the first memory unit 13 as the main memory and executes an application program based on the operating system.

The MMU 12 comprises a page table which indicates the correspondence between virtual pages and physical pages. The MMU 12 is configured to translate a virtual page to a physical page based on an instruction from the CPU 11, and access the first memory unit 13.

Here, the association between the virtual pages and physical pages is carried out using the page table. The embodiment is not limited to this, but association between virtual pages and physical pages can be carried out by using, for example, B-Tree Structure.

The first memory unit 13 comprises a volatile memory having a high data transfer rate and also being randomly writable. The volatile memory is, for example, a static random access memory (SRAM). Here, the embodiment is not limited to this, but, for example, a dynamic random access memory (DRAM) may be used.

The second memory unit 14 has a data transfer rate lower than that of the first memory unit 13 and a storage capacity larger than that of the first memory unit 13. The second memory unit 14 comprises a destructive readout memory such as a magnetic random access memory (MRAM) or resistive random access memory (ReRAM). The CPU 11, accessing both the first memory unit 13 and the second memory unit 14, transfers data between the first memory unit 13 and the second memory unit 14.

Here, the term "destructive read" means a read operation in which data stored in a memory changes to data different from the original when the data is read from the memory. The word "destruction" is not limited to the case where data stored in a memory is deleted completely or changed to completely different data instantaneously when the data is read, but it also includes a case where data is gradually changed to data different from the original until the next read operation.

Figure 2:
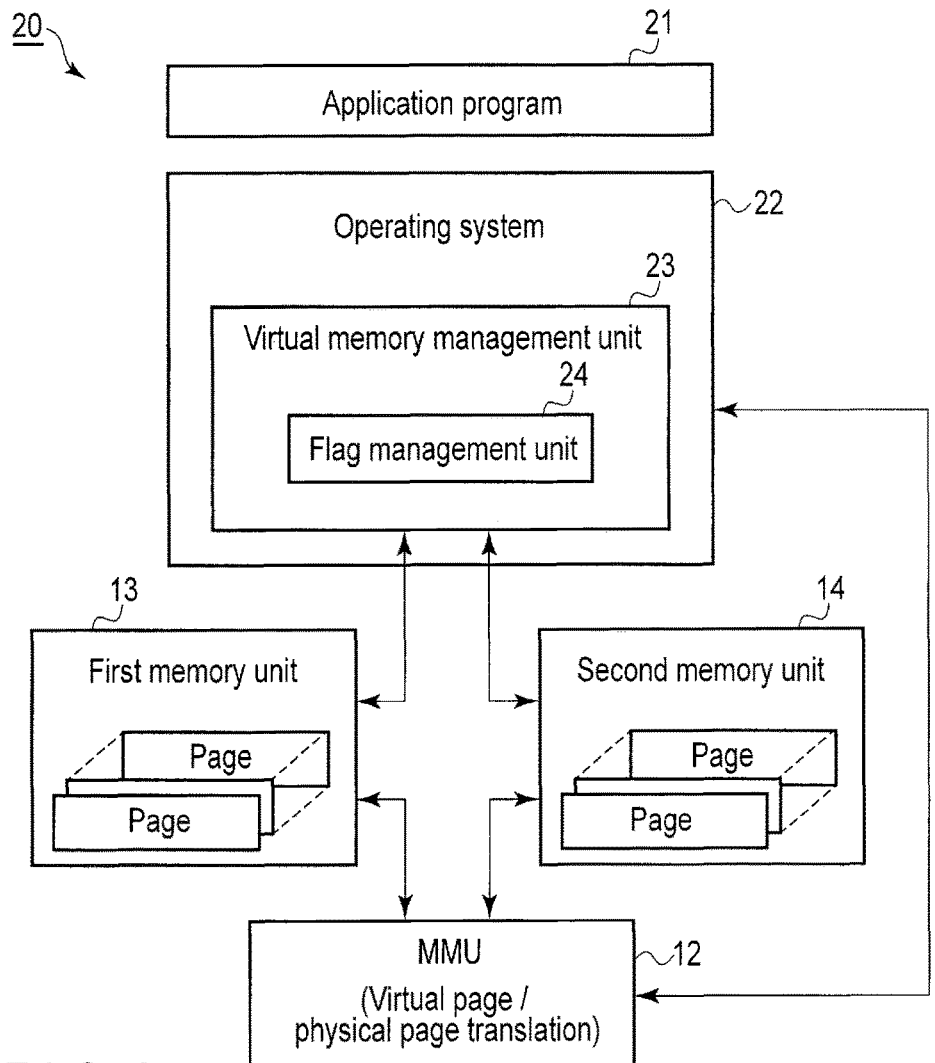
FIG. 2 schematically shows a configuration of a virtual memory management device according to the first embodiment.

FIG. 2 shows an example of a virtual memory management device 20 of the first embodiment. The virtual memory management device 20 is accommodated in the computer system 10 and it manages virtual memory. The virtual memory management device 20 comprises an application program 21, an operating system 22, a virtual memory management unit 23, a first memory unit (volatile memory) 13, a second memory unit (destructive readout memory) 14 and MMU 12.

The application program 21 is executed by the CPU 11 based on the operating system 22. Therefore, a program code and data of the application program 21 are provided in the virtual memory. The CPU 11 designates a virtual address and reads the application program 21 out to be executed.

For example, the operating system 22 includes the virtual memory management unit 23. The program code and data of the operating system 22 are stored in, for example, the second memory unit 14, and transferred to the first memory unit 13 therefrom when starting. But the embodiment is not limited to this. It is alternatively possible that a non-volatile memory is provided in the first memory unit 13 and the program code and data of the operating system 22 are stored in the nonvolatile memory. When the second memory unit 14 is a destructive readout memory, the operating system read from the destructive readout memory needs to be written to the destructive readout memory. Whereas when the operating system is stored in the nonvolatile memory in the first memory unit 13, the operating system need not be written.

The virtual memory management unit 23 is configured to manage virtual memory space and virtual addresses, and manage transfer of pages between the first memory unit 13 and the second memory unit 14.

Further, the virtual memory management unit 23 comprises a flag management unit 24. The flag management unit 24 is configured to manage a flag provided for each page.

Figure 3A:
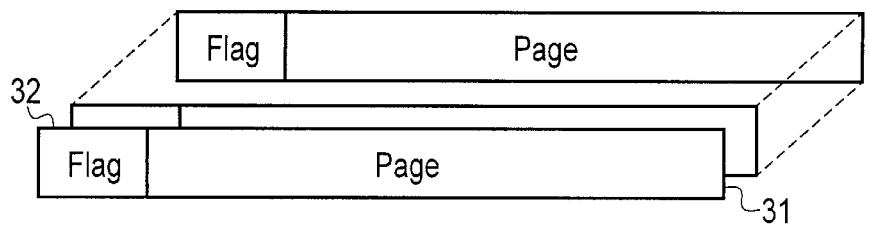
FIGS. 3A, 3B, 3C and 3D are each a schematic diagram showing an example of a flag applied to the first embodiment.

FIG. 3A shows a state of a flag 32 managed by the flag management unit 24. The flag management unit 24 is configured to manage the flag 32, which is, for example, one-bit data stored in a one-bit memory region, provided for each page 31.

Figure 3B:
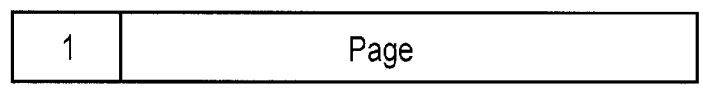
Figure 3C:
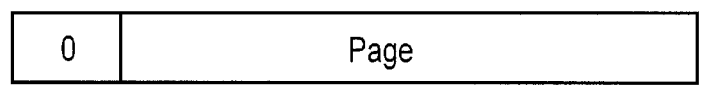

The flag 32 is determined by the flag management unit 24 as to whether or not it should be set in, for example, a page-in in which a page is transferred from the second memory unit 14 to the first memory unit 13. FIG. 3B shows a state in which the flag 32 is set, that is, data "1" as the first state is written to the memory region. FIG. 3C shows a state in which the flag 32 is not set, that is, data "0" as the second state is retained in the memory region.

Here, the flag 32 functions as an indicating unit configured to instruct whether or not data contained in a page should be written to the second memory unit 14. Therefore, the flag 32 should only be data with which it can be at least determined whether or not data in the page should be written to the second memory unit 14. Therefore, the flag is not limited to one-bit data.

Further, the setting of the flag is indicated as retaining data "1" in the memory region, but the embodiment is not limited to this. It suffices only if data usable to determine whether or not at least data in a page should be written to the second memory unit 14 is retained in the memory region.

Figure 3D:
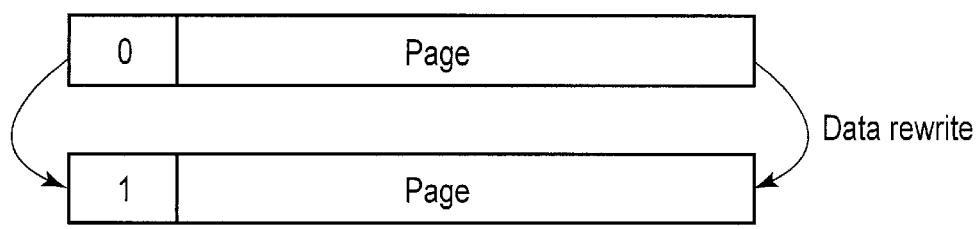

Further, if the flag 32 is, at first, not set in a page-in, but after page-in, the data of the page is changed, a flag is set. FIG. 3D shows that the flag is set as the data of the page changed.

Contents of the flag set to correspond to the page are determined in a page-out in which the page is transferred from the first memory unit 13 to the second memory unit 14. That is, the data of a page in which a flag is set needs to be written to the second memory unit 14, whereas the data of a page in which a flag is not set need not be written to the second memory unit 14.

For example, as to such data which is in a page-in state from the second memory unit 14 to the first memory unit 13, and also instructed to be deleted from the application program 21 or the operating system 22, the flag management unit 24 sets zero to the flag of the data so that it is not written back from the first memory unit 13 to the second memory unit 14.

Figure 4A:
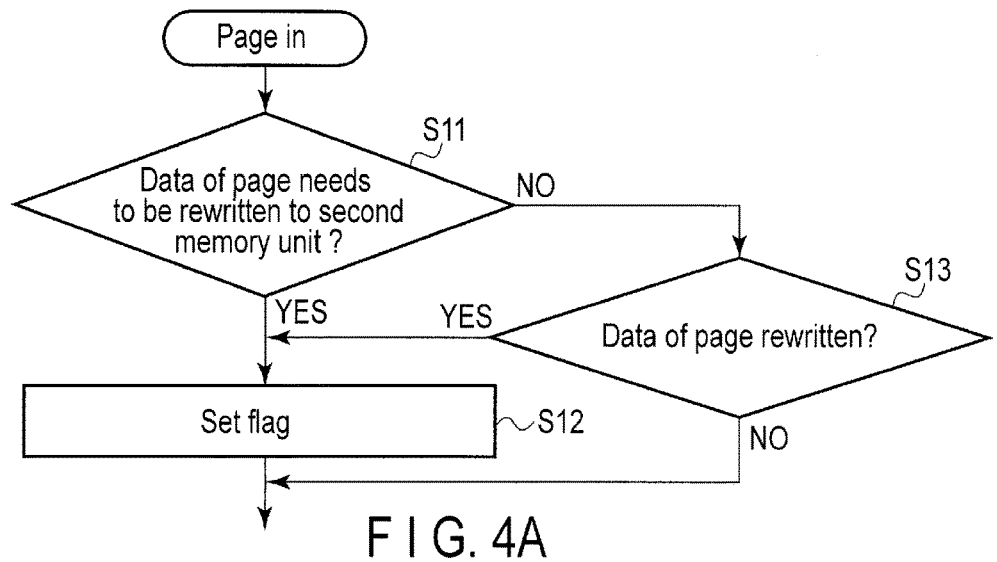
FIGS. 4A and 4B show a flowchart to illustrate the operation of the first embodiment.
Figure 4B:
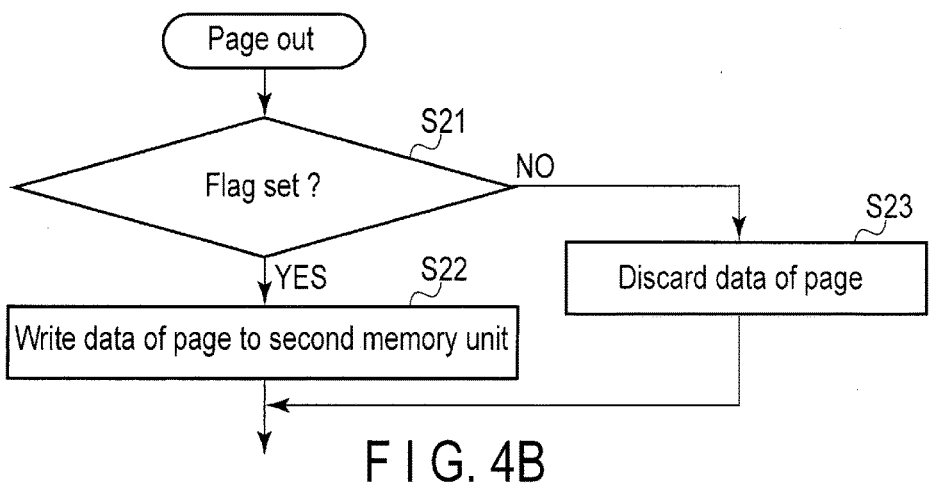

FIGS. 4A and 4B schematically show the above-described operation of the virtual memory management unit 23 and the flag management unit 24.

FIG. 4A shows the operation in a page-in. For example, upon execution of the application program 21, the data of necessary pages is transferred from the first memory unit 13 to the second memory unit 14. When a page other than those stored in the first memory unit 13 is accessed in the middle of execution of the application program 21, a page fault occurs and the corresponding page is transferred from the second memory unit 14 to the first memory unit 13. In the page-in in which the corresponding page is transferred from the second memory unit 14 to the first memory unit 13, the flag management unit 24 determines whether or not the data of the page need to be written to the second memory unit 14 (S11). Whether or not the writing is necessary is instructed by, for example, the application program 21. Note that the embodiment is not limited to this, but whether or not the writing is necessary may be instructed by the operating system 22.

When determined that the writing is necessary, a flag corresponding to the page is set (S12). When determined that the writing is not necessary, a flag corresponding to the page is not set.

After that, whether or not data of a page in the first memory unit 13 has been written is determined (S13). If the result indicates that data of the page has been written, the flag corresponding to the page is set (S12). Thus, when the data of a page is written after the page is transferred from the second memory unit 14 to the first memory unit 13, the data of the page retained in the first memory unit 13 does not coincide with the data of the page retained in the second memory unit 14. Therefore, the so-called dirty flag is set in the flag 32.

On the other hand, when the memory region of the first memory unit 13 is insufficient, unnecessary pages are transferred to the second memory unit 14 in order to assure a memory region. In selection of pages to be transferred to the second memory unit 14, an algorithm such as least recently used (LRU) or least frequently used (LFU) can be applied. Moreover, pages to be transferred to the second memory unit 14 can be selected sequentially. In this case, pages may be selected by first-in first-out (FIFO).

As shown in FIG. 4B, in a page-out in which pages are transferred from the first memory unit 13 to the second memory unit 14, the contents of the flag corresponding to a page to be transferred are determined (S21). Pages determined, based on the result, to be that the flag is set therein are written to the second memory unit 14 (S22). On the other hand, pages determined to be that the flag is not set therein are discarded without being written to the second memory unit 14 (S23).

(Effect of First Embodiment)

According to the first embodiment, a flag is provided for each page, and for those pages that need to be written to the second memory unit 14, a corresponding flag is set in a page-in, whereas for those pages that need not be written to the second memory unit 14, a corresponding flag is not set. Further, if the data of a page is written after the page-in, a flag corresponding to the page is set. After that, the state of the flag is determined in the page-out, the data of only those pages in which the flag is set is written to the second memory unit 14. Thus, the case where the second memory unit 14 is a destructive readout memory such as MRAM or ReRAM, only those pages that need to be written are written. Therefore the number of writes to the second memory unit 14 can be reduced. Thus, even if the number of writes for the second memory unit 14 is limited, the increase in the number of writes can be suppressed, thereby making it possible to prolong the life of the destructive readout memory.

Second Embodiment

The first embodiment is directed to a computer system comprising a virtual memory device, in which a flag is set as needed in a page-in where data is transferred from the second memory unit 14 to the first memory unit 14, and only those pages in which the flag is set are written to the second memory unit 14 in a page-out. The technical concept of the first embodiment is applicable to a computer system comprising a cache memory.

Figure 5:
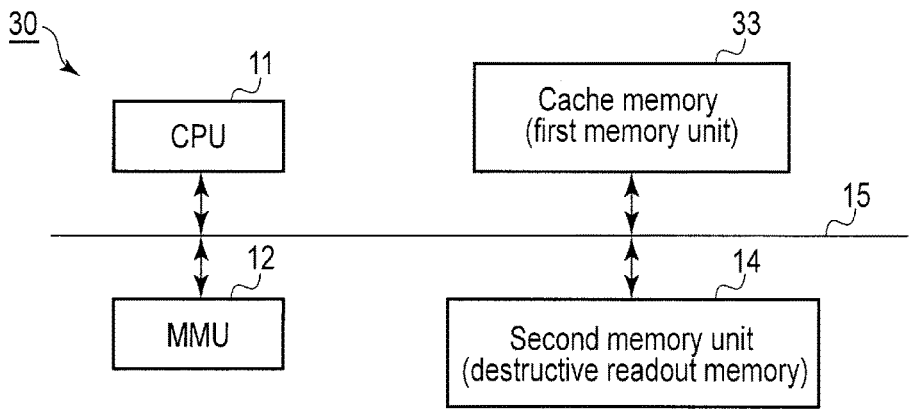
FIG. 5 is a schematic diagram schematically showing an example of a computer system according to the second embodiment.

FIG. 5 schematically shows a computer system comprising a cache memory of the second embodiment. The same elements as those shown in FIG. 1 are designated by the same reference numbers in FIG. 5.

As shown in FIG. 5, a computer system 30 comprises a CPU 11, an MMU 12, a cache memory 33 as a first memory unit and a second memory unit 14 as an external memory unit, etc. The CPU 11, MMU 12, cache memory 33 and second memory unit 14 are connected to each other by a bus 15.

The CPU 11 is configured to control the entire operation of the computer system 30. The CPU 11, for example, reads the operating system from the cache memory 33 and executes an application program based on the operating system.

The MMU 12 comprises a page table which indicates the correspondence between virtual pages and physical pages.

The MMU 12 is configured to translate a virtual page to a physical page based on an instruction from the CPU 11, and access the actual main memory. Further, the MMU 12 is configured to control the operation of the cache. But it is alternatively possible that the MMU 12 does not control the operation of the cache.

The cache memory 33 is constituted by a randomly rewritable volatile memory having a high data transfer rate. The volatile memory is, for example, an SRAM. The memory is not limited to this, but a DRAM or the like may be used.

The second memory unit 14 has a data transfer rate lower than that of the cache memory 33 but has a capacity larger than that of the cache memory 33. The second memory unit 14 is constituted by a destructive readout memory such as MRAM or ReRAM. The CPU 11, accessing both the cache memory 33 and the second memory unit 14, transfers data between the cache memory 33 and the second memory unit 14.

FIG. 6 shows an example of a cache management device 40 of the second embodiment. The cache management device 40 is accommodated in the computer system 30 and it manages cache operation. The cache management device 40 comprises an application program 21, an operating system 22, a cache management unit 43, a cache memory 33, a second memory unit (destructive readout memory) 14 and MMU 12.

The application program 21 is executed by the CPU 11 based on the operating system 22. The operating system 22 comprises the cache management device unit 43.

The cache management unit 43 is configured to manage the second memory unit 14 in units of lines of, for example, several bytes to several tens of bytes. The cache management unit 43 writes data to the cache memory 33 in units of lines based on, for example, a data write request. When there is no empty region in the cache memory 33, unnecessary lines are selected and pushed out from the cache memory 33. Such lines may be selected using an algorithm such as LRU, LFU or FIFO, or at random.

When a data read request is issued, but the requested data is not present in the cache memory 33, that is, when a cache miss occurs, the cache management unit 43 reads corresponding data from the second memory unit 14 in units of lines, and transfers the data to the cache memory 33.

Further, the cache management unit 43 writes data to a memory using, for example, a write-back mode. That is, when writing data, the data is written to the cache memory 33 only, and later, the data in the cache memory 33 is written to the second memory unit 14. In this manner, the number of writes to a destructive readout memory, which has a limited number of writes, can be reduced. Note that the method is not limited to this, but a write-through method can be used, in which based on the writing of data, the same data is written to the cache memory 33 and the second memory unit 14.

Further, the cache management unit 43 comprises a flag management unit 44. The flag management unit 44 manages flags each provided for each respective line.

Figure 7A:
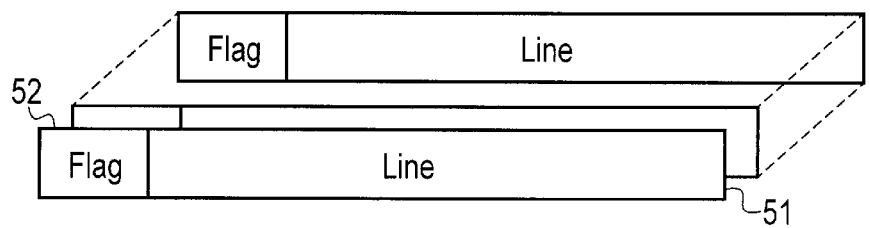
FIGS. 7A, 7B, 7C and 7D are each a schematic diagram showing an example of a flag applied to the second embodiment.
Figure 7B:
Figure 7C:
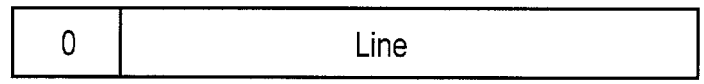

FIG. 7A shows how the flags are managed by the flag management unit 44. The flag management unit 44 manages a flag 52 provided for each of lines 51. The flag 52 is determined by the flag management unit 44 as to whether or not it should be set in a line-in in which lines are transferred, for example, from the second memory unit 14 to the cache memory 33. FIG. 7B shows a state in which the flag 52 is set (data "1"), and FIG. 7C shows a state in which the flag 52 is not set (data "0").

Figure 7D:
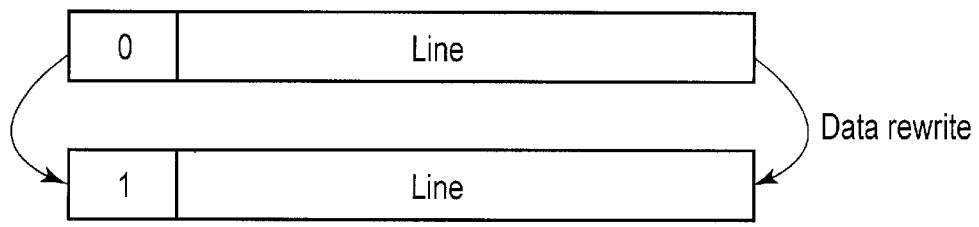

Further, if the flag 52 is, at first, not set in a line-in, but after line-in, the data of the line is changed, a flag is set. FIG. 7D shows that the flag is set as the data of the line is changed.

Contents of the flag set to correspond to the line are determined in a line-out in which the line is transferred from the cache memory 33 to the second memory unit 14. That is, the data of a line in which a flag is set needs to be written to the second memory unit 14, whereas the data of a line in which a flag is not set need not be written to the second memory unit 14.

FIGS. 8A and 8B schematically show the above-described operation of the cache management unit 43 and the flag management unit 44.

FIG. 8A shows the operation in a line-in. For example, upon execution of the application program 21, the data of necessary lines is transferred from the cache memory 33 to the second memory unit 14. When a line other than those stored in the cache memory 33 is accessed in the middle of execution of the application program 21, a cache miss occurs and the corresponding line is transferred from the second memory unit 14 to the cache memory 33. Thus, in the line-in in which the corresponding line is transferred from the second memory unit 14 to the cache memory 33, the flag management unit 44 determines whether or not the data of the line needs to be written to the second memory unit 14 (S31). Whether or not the writing is necessary is instructed by, for example, the application program 21. Note that the embodiment is not limited to this, but whether or not the writing is necessary may be instructed by the operating system 22.

When determined that the writing is necessary, a flag corresponding to the line is set (S32). When determined that the writing is not necessary, a flag corresponding to the line is not set.

After that, whether or not data of a line in the cache memory 33 has been written is determined (S33). If the result indicates that data of the line has been written, the flag corresponding to the line is set (S32). Thus, when the data of a line is written after the page is transferred from the second memory unit 14 to the cache memory 33, the data of the line retained in the cache memory 33 does not coincide with the data of the line retained in the second memory unit 14. Therefore, the so-called dirty flag is set in the flag 52.

On the other hand, when the memory region of the cache memory 33 is insufficient, unnecessary lines are transferred to the second memory unit 14 in order to assure a memory region.

As shown in FIG. 8B, in a line-out in which lines are transferred from the cache memory 33 to the second memory unit 14, the contents of the flag corresponding to a line to be transferred are determined (S41). Lines determined, based on the result, to be that the flag is set therein are written to the second memory unit 14 (S42). On the other hand, lines determined to be that the flag is not set therein are discarded without being written to the second memory unit 14 (S43).

(Effect of Second Embodiment)

According to the second embodiment, a flag is provided for each line, and for those lines that need to be written to the second memory unit 14, a corresponding flag is set in a line-in, whereas for those lines that need not be written, a corresponding flag is not set. Further, if the data of a line is written after the line-in, a flag corresponding to the line is set. After that, the state of the flag is determined in the line-out, the data of only those lines in which the flag is set is written to the second memory unit 14. Thus, the case where the second memory unit 14 is a destructive readout memory such as MRAM or ReRAM, only those lines that need to be written are written. Therefore, the number of writes to the second memory unit 14 can be reduced. Thus, even if the number of writes for the second memory unit 14 is limited, the increase in the number of writes can be suppressed, thereby making it possible to prolong the life of the destructive readout memory.

(Modification)

The first and second embodiments described above are each directed to a computer system applied to, for example, a personal computer. The embodiments are not limited to these, but it is also possible to apply these embodiments to, for example, a host device such as a server in a data center or a cloud computing system operated in companies.

FIG. 9 schematically shows a case where the first or second embodiment is applied to such a host device 60.

In the host device 60, for example, a first board 61 comprises a plurality of connectors (for example, slots) 62. Each of the connectors 62 is constituted by Serial Attached SCSI (SAS). Note that the case is not limited to SAS, but an interface connecting between computers, for example, PCI Express (PCIe) can be applied as well. In each connector 62, a second board 63 is mounted. The computer system 10 of the first embodiment or the computer system 30 of the second embodiment is packaged on the second board 63.

Note that the second memory unit 14 can be packaged on a board separate from the second board 63, or, for example, one second memory unit 14 can be shared by two or more second boards 63 using SAS.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage system comprising:
   a first memory unit;
   a second memory unit with a data transfer rate lower than that of the first memory unit; and
   a controller configured to transfer data from the second memory unit to the first memory unit during a first operation and data from the first memory unit to the second memory unit during a second operation,
   wherein the controller is further configured to:
   during the first operation, setting a first state for data that is transferred to the first memory unit but not retained in the second memory unit and, during the second operation, write the data having the first state to the second memory unit.

2. The system according to claim 1, wherein the second memory unit comprises a memory of which data retained therein is destroyed when the data is read.

3. The system according to claim 2, wherein when the data is not to be written to the second memory unit, the controller does not set the first state.

4. The system according to claim 3, wherein when the first state is not set and when the data is written after the data is transferred from the second memory unit to the first memory unit, the controller sets the first state, the first state corresponding to the data which is written.

5. The system according to claim 4, wherein
the controller comprises a first management unit configured to manage a virtual memory space and a virtual address, and to manage transfer of the data between the first memory unit and the second memory unit.

6. The system according to claim 5, wherein the data is contained in a page.

7. The system according to claim 4, wherein
the controller comprises a second management unit configured to write the data to the first memory unit based on a data write request and to read data corresponding to a read request from the second memory unit when data corresponding to the read request is absent in the first memory unit.

8. The system according to claim 7, wherein the data is data in units of lines of a cache.

9. A server system comprising a plurality of computer systems of claim 1 mounted therein.

10. A storage system comprising:
a first memory unit;
a second memory unit with a data transfer rate lower than that of the first memory unit; and
a controller configured to transfer data of a page from the second memory unit to the first memory unit during a page-in operation and data of the page from the first memory unit to the second memory unit during a page-out operation,
wherein the controller is further configured to:
during the page-in, set a first state for data of the page that is transferred to the first memory unit but not retained in the second memory unit and, during the page-out, write the data of the page having the first state to the second memory unit.

11. The system according to claim 10, wherein the second memory unit comprises a memory of which data retained therein is destroyed when the data is read.

12. The system according to claim 11, wherein
the controller comprises a management unit configured to manage a virtual memory space and a virtual address, and to manage transfer of the data of the page between the first memory unit and the second memory unit.

13. A server system comprising a plurality of computer systems of claim 10 mounted therein.

14. A storage system comprising:
a first memory unit;
a second memory unit with a data transfer rate lower than that of the first memory unit; and
a controller configured to transfer data of a line from the second memory unit to the first memory unit during a first operation and data of the line from the first memory unit to the second memory unit during a second operation,
wherein the controller is further configured to:
during the first operation, set a first state for data of the line that is transferred to the first memory unit but not retained in the second memory unit and, during the second operation, write the data of the line having the first state to the second memory unit.

15. The system according to claim 14, wherein the second memory unit comprises a memory of which data retained therein is destroyed when the data is read.

16. The system according to claim 15, wherein
the controller comprises a management unit configured to write the data of the line in the first memory unit based on a write request and to read, when data corresponding to a read request is absent in the first memory unit, data corresponding to the read request from the second memory unit.

17. A server system comprising a plurality of computer systems of claim 14 mounted therein.

* * * * *